United States Patent
Marchetti

(10) Patent No.: US 9,610,989 B2
(45) Date of Patent: Apr. 4, 2017

(54) COMPACT TRAILER, PARTICULARLY FOR BICYCLES AND MOTORCYCLES

(71) Applicant: Marcello Marchetti, Finale Emilia (IT)

(72) Inventor: Marcello Marchetti, Finale Emilia (IT)

( * ) Notice: Subject to any disclaimer, the term of this patent is extended or adjusted under 35 U.S.C. 154(b) by 0 days.

(21) Appl. No.: 14/785,344

(22) PCT Filed: Apr. 16, 2014

(86) PCT No.: PCT/IB2014/060756
§ 371 (c)(1),
(2) Date: Oct. 18, 2015

(87) PCT Pub. No.: WO2014/170836
PCT Pub. Date: Oct. 23, 2014

(65) Prior Publication Data
US 2016/0083030 A1 Mar. 24, 2016

(30) Foreign Application Priority Data

Apr. 19, 2013 (IT) .............................. MO20130014 U

(51) Int. Cl.
| | |
|---|---|
| *B62B 1/00* | (2006.01) |
| *B62D 63/06* | (2006.01) |
| *B62K 27/00* | (2006.01) |
| *B62D 63/08* | (2006.01) |

(52) U.S. Cl.
CPC ........... *B62D 63/061* (2013.01); *B62D 63/08* (2013.01); *B62K 27/003* (2013.01)

(58) Field of Classification Search
CPC ........ B60D 1/00; B60D 63/061; B60D 63/08; B60B 7/06; B60B 7/10; B60B 3/02
See application file for complete search history.

(56) References Cited

U.S. PATENT DOCUMENTS

| | | | | |
|---|---|---|---|---|
| 4,256,321 A * | 3/1981 | Trulove | ................ | B62K 27/04 135/88.13 |
| 5,308,096 A * | 5/1994 | Smith | .................... | B62K 27/02 224/415 |
| 5,454,577 A * | 10/1995 | Bell | ......................... | B62B 3/02 280/204 |
| 5,687,980 A * | 11/1997 | Eckroth | ................. | B62K 27/12 280/204 |
| 6,302,421 B1 * | 10/2001 | Lee | ........................ | A61G 5/023 280/210 |

(Continued)

*Primary Examiner* — Hau Phan
(74) *Attorney, Agent, or Firm* — Stolmar & Partner; Robert Lelkes

(57) ABSTRACT

A compact trailer (1) comprising a connecting element (13) that can be associated with a frame of a bicycle or motorcycle, and a cart (2) that has a loading bed (3) and an edge provided with at least two mutually opposite side walls (6) with which respective wheels (7) for moving the trailer resting on the ground (S) are associated so that they can rotate about respective axes that are transverse to the direction of advancement (A) of the trailer (1). A recessed cavity (8) is provided on each one of the two side walls (6) and at least partially accommodates the respective wheel (7). Each cavity (8) has a depth that is at least equal to the axial space occupation of the respective wheel (7) accommodated inside it, so that in plan view the wheels (7) do not protrude from the outline of the cart (2).

8 Claims, 6 Drawing Sheets

(56) References Cited

U.S. PATENT DOCUMENTS

| | | | | |
|---|---|---|---|---|
| 6,705,628 B2 * | 3/2004 | Kahmann | ............... | B62B 7/06 |
| | | | | 280/204 |
| D507,208 S * | 7/2005 | Ulch | ........................ | D12/102 |
| 7,144,070 B2 * | 12/2006 | Wiebe | .................. | B60R 9/055 |
| | | | | 296/183.1 |
| 7,341,265 B1 * | 3/2008 | Liu | ..................... | B62K 27/12 |
| | | | | 280/204 |
| 7,354,058 B2 * | 4/2008 | Chou | ............... | B62D 63/061 |
| | | | | 280/651 |
| 7,387,310 B1 * | 6/2008 | Liu | ........................ | B62B 7/10 |
| | | | | 280/47.38 |
| 7,445,222 B2 * | 11/2008 | Bell | ..................... | B60D 1/00 |
| | | | | 280/204 |
| 2002/0074764 A1 * | 6/2002 | Allen | ................. | B62K 27/003 |
| | | | | 280/204 |

\* cited by examiner

COMPACT TRAILER, PARTICULARLY FOR BICYCLES AND MOTORCYCLES

The present invention relates to a compact trailer, particularly for bicycles and motorcycles.

For the transport of particularly bulky objects by means of bicycles or motorcycles it is known to use trailers that can be connected to an adapted tow hook associated with the frame of a bicycle or motorcycle. Such trailers are constituted mainly by a cart, that can be accessed from the outside by means of an upper opening and by an element for connection to the tow hook of the towing vehicle. The cart has an edge provided with at least two side walls, which are opposite and substantially mutually parallel and on which two pivots are provided so as to protrude; respective wheels for moving said trailer resting on the ground are associated with said pivots. Said pivots have longitudinal axes that are arranged transversely to the advancement direction of said trailer. Furthermore, said trailers can also have one or more auxiliary wheels which, together with the two movement wheels, allow the easy movement of the trailer on its own, not connected to the tow hook.

These trailers of the known type are not devoid of drawbacks, which include the fact that they make it difficult to use them in tight spaces. During the use of the trailer on its own, separated from the towing vehicle, the wheels associated with pivots that protrude from the side walls increase considerably the lateral space occupation dimensions of the trailer and are a hindrance during the movement of said trailer, colliding with any obstacles that are difficult to see for the user who drives the trailer by pushing it. This drawback can be more observed during use of the trailer in aisles between shelves of supermarkets, in which space is very limited; moreover, during the movement of the trailer in supermarkets the movement wheels can accidentally collide with the goods on display on the shelves, making them fall disastrously to the ground.

Another drawback of these trailers of the known type resides in that they have a considerable space occupation also when they are not being used, requiring necessarily their storage in adapted spaces, occupying a large surface of garages, basements or other suitably sized enclosed spaces.

The aim of the present invention is to provide a compact trailer that obviates the drawbacks and overcomes the limitations of the background art, allowing easy use of the trailer when separated from the towing vehicle.

Within this aim, an object of the present invention is to provide a trailer that has a reduced space occupation when it is not being used, allowing to store it even in tight spaces.

Another object of the invention is to provide a trailer capable of giving the greatest assurances of reliability and safety in use.

Another object of the invention is to provide a trailer that is easy to provide and economically competitive if compared with the background art.

This aim and these and other objects that will become better apparent hereinafter are achieved by a compact trailer, particularly for bicycles and motorcycles, comprising a connecting element that can be associated with a frame of a bicycle or motorcycle and a cart that has a loading bed and an edge provided with at least two mutually opposite side walls with which respective wheels for moving said trailer resting on the ground are associated so that they can rotate about respective axes that are transverse to the direction of advancement of the trailer, characterized in that a recessed cavity is provided on each one of said two side walls and partially accommodates the respective movement wheel, said cavity having a depth that is at least equal to the axial space occupation of the respective movement wheel accommodated inside it, so that in plan view said movement wheels do not protrude from the outline of said cart.

Further characteristics and advantages will become better apparent from the description of a preferred but not exclusive embodiment of a compact trailer, particularly for bicycles and motorcycles, illustrated by way of non-limiting example with the aid of the accompanying drawings, wherein.

Figure 1:
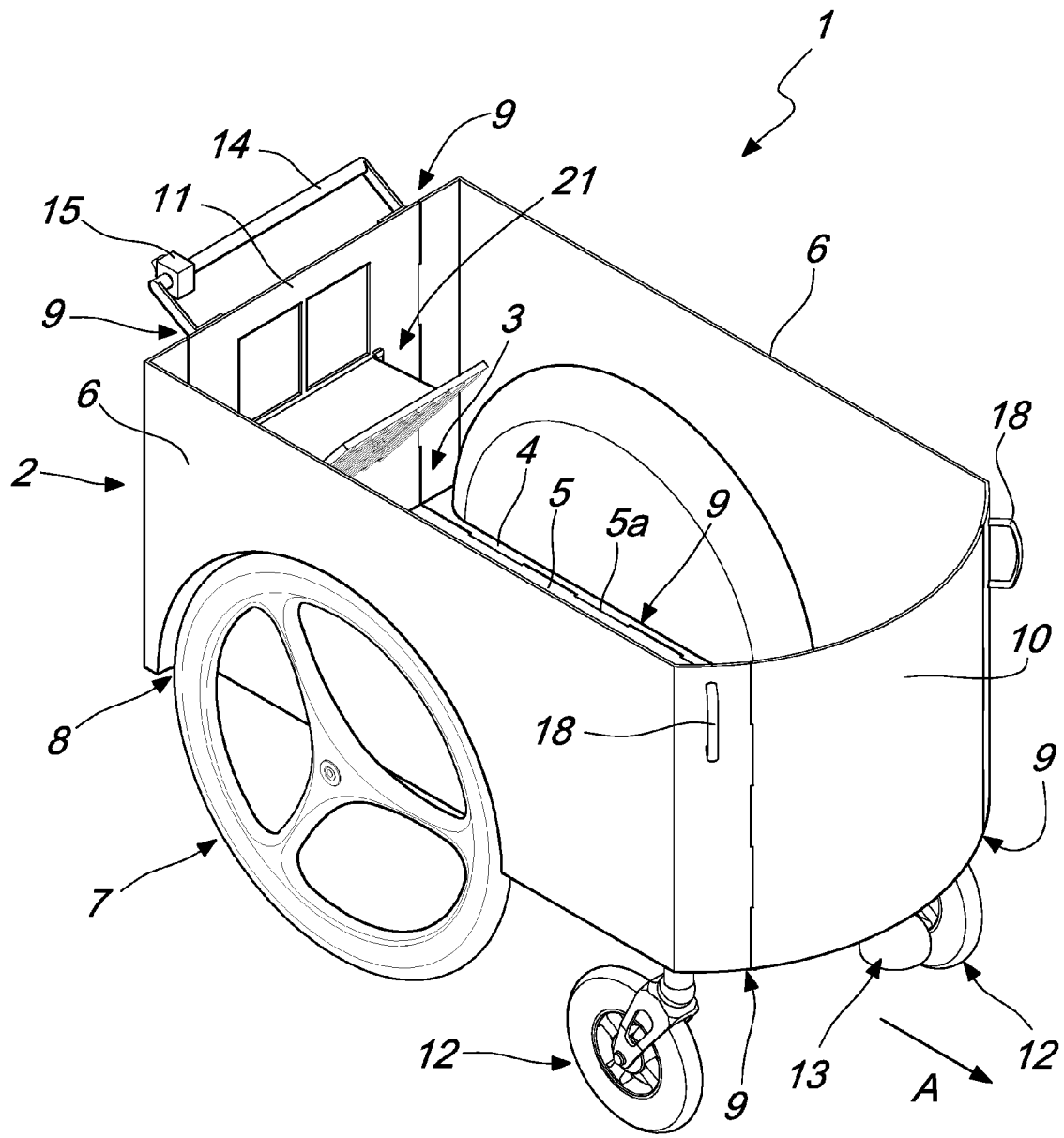
FIG. 1 is a schematic perspective view of a compact trailer, particularly for bicycles and motorcycles, according to the invention, in a configuration for use.

With reference to the figures, the compact trailer, particularly for bicycles and motorcycles, generally designated by the reference numeral 1, comprises a cart 2 that has a loading bed 3 and an edge provided with at least two mutually opposite side walls 6, with which respective wheels 7 for moving said trailer resting on the ground S are associated. The two movement wheels 7 have respective rotation axes that are transverse to the advancement direction A of the trailer 1. The trailer 1 comprises furthermore a connecting element 13, which can be associated with a frame of a bicycle, a motorcycle or another towing vehicle.

According to the invention, on each of the two side walls 6 a recessed cavity 8 is provided which accommodates, at least partially, the respective movement wheel 7. Each cavity 8 has a recessed depth with respect to the outer surface of the respective side wall 6, i.e., toward the inside of the cart 2, that is at least equal to the axial space occupation of the respective movement wheel 7 accommodated inside it. Such shape allows each movement wheel 7 to not protrude laterally toward the outside of the respective side wall 6, i.e., to not protrude from the outline of the carriage 2, limiting the transverse space occupation dimensions with respect to the advancement direction A.

Conveniently, the cart 2 has a space occupation dimension D in plan view, transversely to the advancement direction A, that is comprised substantially between 0.4 and 0.6 meters. Such limited space occupation allows the easy movement of the trailer even between aisles of supermarkets.

The carriage 2 furthermore has a front wall 10 and a rear wall 11, which are interposed between the two side walls 6 which, together with said walls and the bottom 3, define the body of said carriage, which is open at its top, as shown in FIG. 1. Both the front wall 10 and the rear wall 11 have two mutually parallel opposite main sides which are associated rotatably, by means of cylindrical hinges 9 of the conventional type, with contiguous sides of the two side walls 6. Furthermore, the bed 3 also comprises at least two portions, of which one lateral portion 4 is integral with one of the two side walls 6 and a central portion 5 is pivoted to the preceding portion. The central portion 5 has a substantially plate-like body with a quadrangular shape in plan view, which is provided with two main sides 5a and 5b that are mutually opposite. The first main side 5a comprises a first wing of a cylindrical hinge 9, which is associated with a respective second wing that is connected to the lateral portion 4, while the second main side 5b, which can move in an angular fashion about the hinge axis that passes through the cylindrical hinge 9, comprises a stroke limiting abutment element 17 that is intended to rest on the bed 3.

The cylindrical hinges 9 allow the passage of the trailer 1 from a configuration for use to an inactive configuration and vice versa. In particular, in the configuration for use, shown in FIG. 1, the central portion 5 is arranged on a plane that is substantially parallel to the ground S and is transverse to the two side walls 6, and the front wall 10 and the rear wall 11 are arranged on planes that are substantially transverse to the two side walls 6, while in the inactive configuration, shown in FIG. 3, the central portion 5 substantially adheres, at least partially, to one of the two side walls 6, which in turn are closer with respect to the preceding configuration, reducing the transverse space occupation dimensions of said trailer. Furthermore, in the inactive configuration the front wall 10 and the rear wall 11 at least partially adhere substantially to at least one of the two side walls 6.

Figure 6:
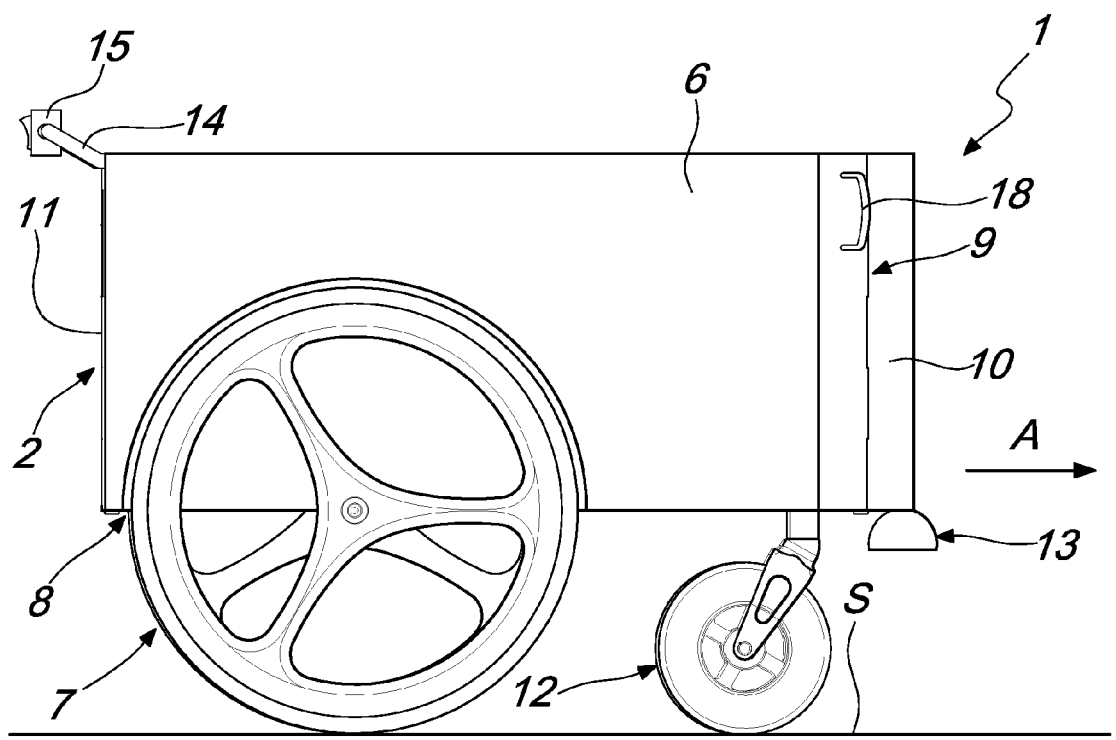
FIG. 6 is a schematic side elevation view of the trailer according to the invention, resting on the ground.
Figure 8:
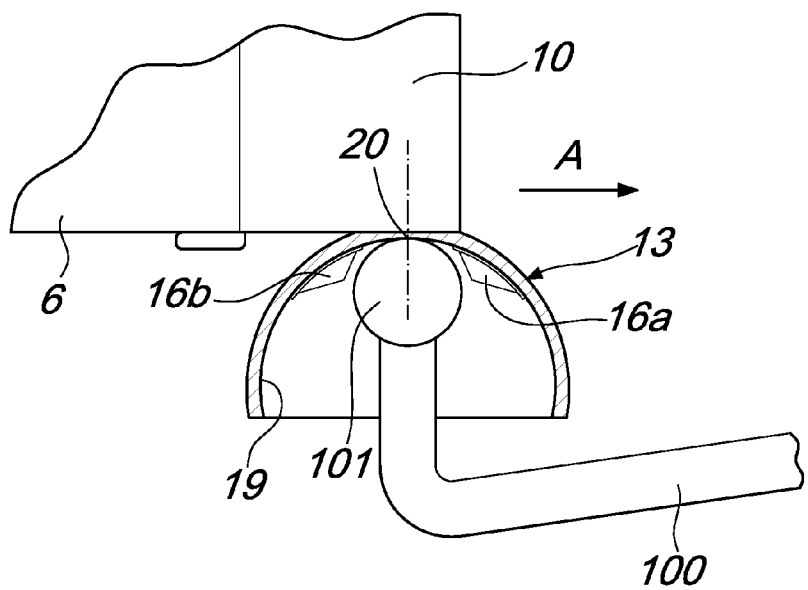
FIG. 8 is a partially sectional enlarged-scale view of a detail of FIG. 7.

In addition to the two movement wheels 7 associated with the respective side walls 6 by interposition of adapted shock absorbing means, not shown in the accompanying figures, the trailer 1 comprises two auxiliary wheels 12 associated with the bottom 3 for the autonomous movement thereof when not connected to any towing vehicle. The two auxiliary wheels 12 and the two movement wheels 7 have an identical distance between the respective point of contact with the ground S and the bed 3, so as to arrange said bed substantially parallel to the ground S, as shown in FIG. 6. The trailer 1 resting on the wheels 7 and 12 can be moved easily by gripping a pusher handle 14 associated with the rear wall 11. The connecting element 13 is associated with the bed 3 and is intended to be coupled to a frame by way of the interposition of a tow hook 100 of a bicycle, of a motorcycle or of another towing vehicle for towing said trailer rested only on its two movement wheels 7. Said connecting element 13 is a hemispherical dome, the inner surface 19 of which is intended to rest on a substantially spherical contact pin 101 of the tow hook 100 in a central point 20, as shown in FIG. 8. To facilitate the lifting of the front part of the trailer 1 and allow the coupling of the tow hook 100 to the connecting element 13, the trailer 1 is provided with lifting handles 18 located on the front wall 10 or, as shown in the accompanying figures, on a portion of the side walls 6 proximate to the front wall 10.

Advantageously, the trailer 1 can comprise automatic traction means of the electric type associated with the two movement wheels 7. Said traction means, not shown in the accompanying figures, can be for example brushless electric motors built into the two movement wheels 7 and can be actuated by at least one of two actuation means 15 and 16. In particular, the first actuation means 15 comprise at least one button for controlling the traction means in the two travel directions (matching and opposing the advancement direction A) of the trailer 1. Said first actuation means 15 are proximate to the pusher handle 14. The second actuation means 16 are associated with the connecting element 13 and can be actuated by the tow hook 100 of the moving towing vehicle. Conveniently, the second actuation means 16 comprise a first button 16a for the actuation of the traction means in the travel direction of the trailer 1 that matches the advancement direction A and a second button 16b for the actuation thereof in the opposite direction of travel. The first button 16a is arranged on a portion of the inner surface 19 that is shifted toward the advancement direction A with respect to the midpoint 20, as shown in FIG. 8, while the position of the second button 16b is substantially mirror-symmetrical with respect to the first button 16a relative to said midpoint.

In addition, or as an alternative, to the actuation means 15 and 16 described above, the trailer can comprise additional actuation means, which can be actuated directly by the user on the towing vehicle. In particular, said additional actuation means can be associated with the handlebar of the bicycle and allow the progressive control of the increase or decrease of the advancement speed of the traction means. Conveniently, the additional actuation means, not shown in the accompanying figures, can be of the electric type and can comprise potentiometers associated for example with the knob of the towing bicycle for their easy control.

Advantageously, the rear wall 11 can accommodate a seating element 21 that is defined by a child seat that can be folded up when not in use or when the trailer 1 is stored. To reduce the overall weight of the cart 2, the two side walls 6, the front wall 10, the rear wall 11 and/or the bottom 3 can have a plurality of through holes or can be constituted by appropriately shaped grilled walls. The trailer 1 can be provided with covering sheets that can be associated with the upper edges of the walls 6, 10 and 11 to protect the material being transported. Furthermore, it is possible to use containment bags, made of liquid-impermeable material, in which the rims of the respective mouths are associable with the edges of the walls 6, 10 and 11.

Operation of the compact trailer 1, particularly for bicycles and motorcycles, is described hereinafter.

Figure 2:
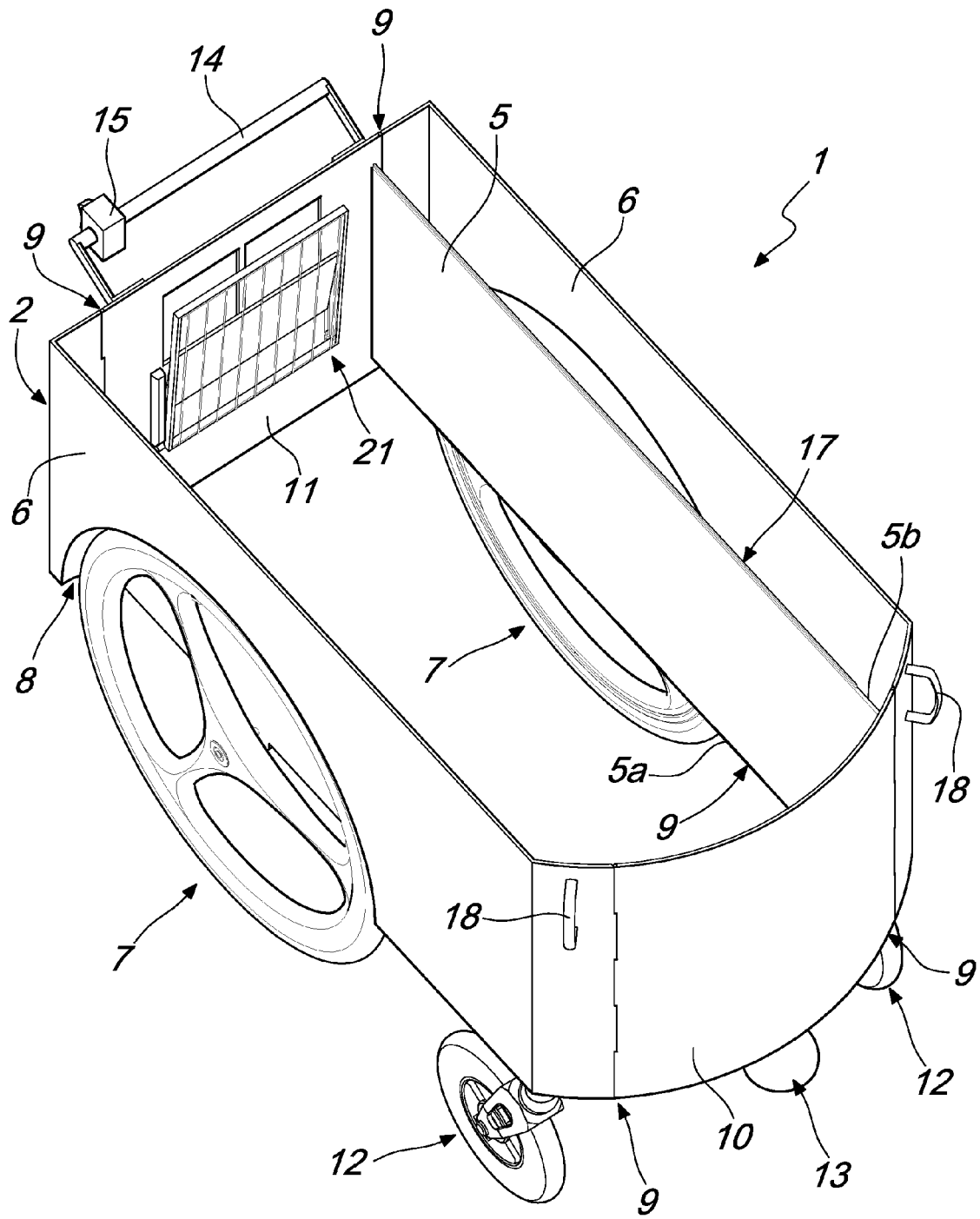
FIG. 2 is a schematic perspective view of the trailer according to the invention, in a transient step between the configuration for use and an inactive configuration.
Figure 3:
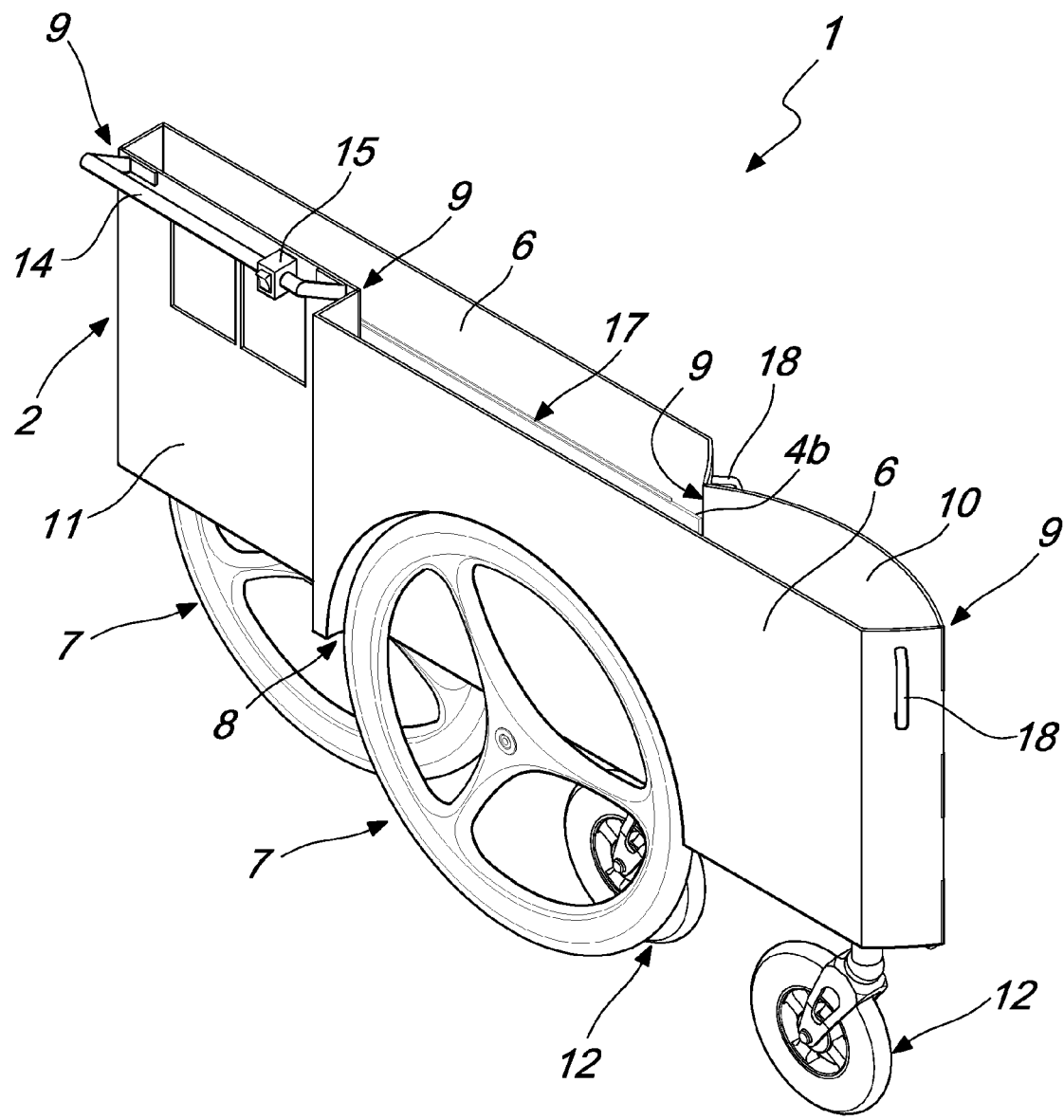
FIG. 3 is a schematic perspective view of the trailer according to the invention, in the inactive configuration.
Figure 4:
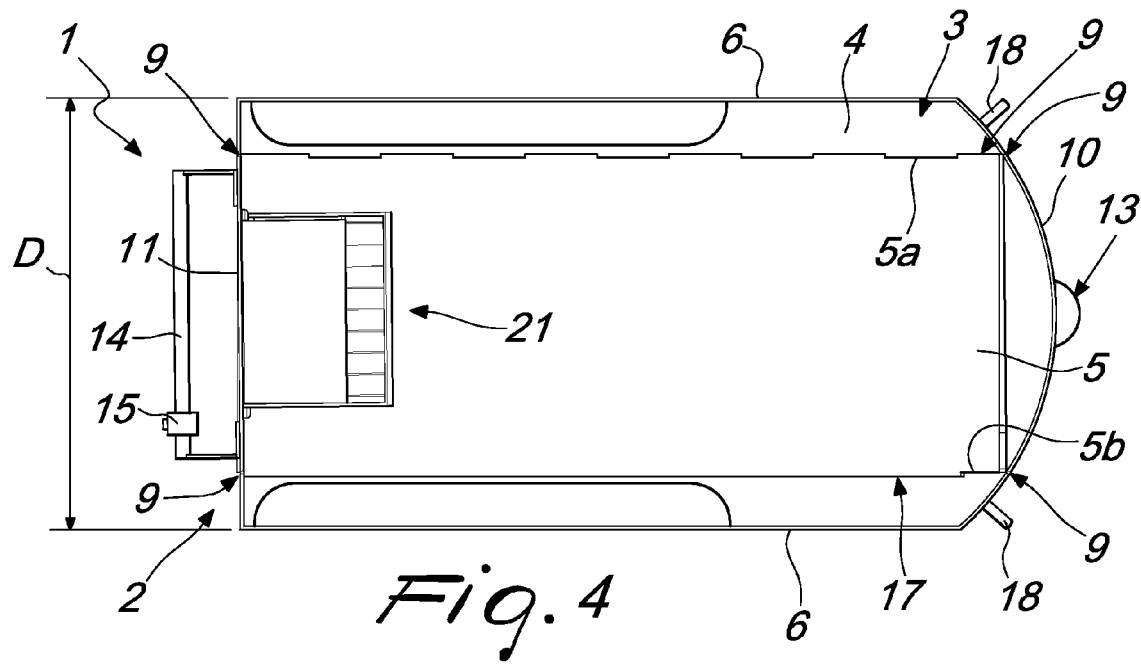
FIG. 4 is a schematic top plan view of the trailer according to the invention, in the active configuration.
Figure 5:
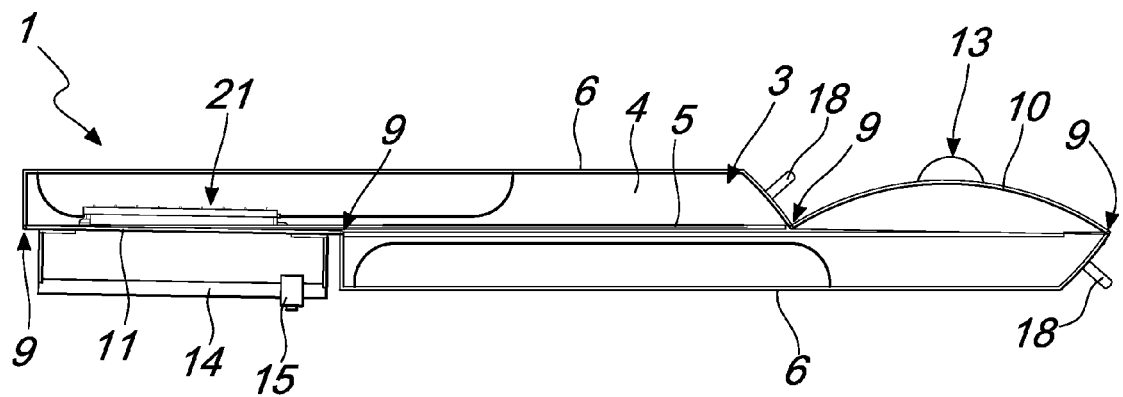
FIG. 5 is a schematic top plan view of the trailer according to the invention, in the inactive configuration.
Figure 7:
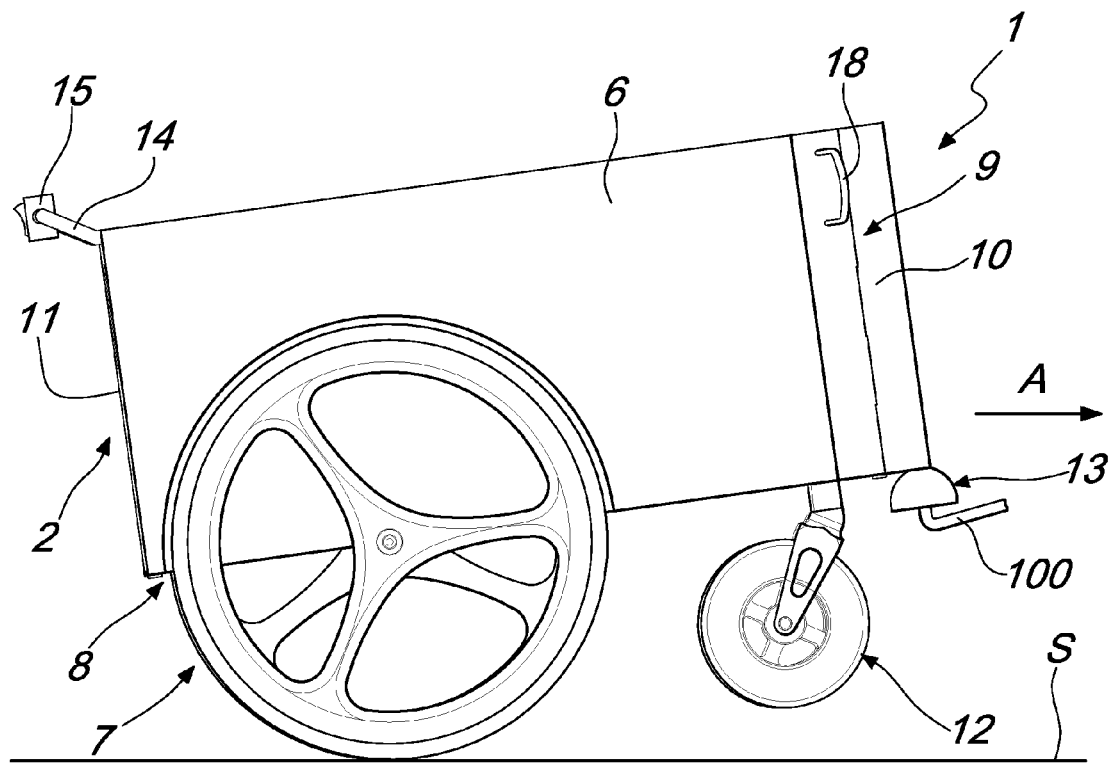
FIG. 7 is a schematic side elevation view of the trailer according to the invention, during towing.

In the configuration for use and not coupled to the tow hook 100, as shown in FIG. 1, the trailer 1 can be used easily in tight spaces, since the two movement wheels 7, inside the respective cavities 8, do not protrude from the side walls 6 and do not collide against any lateral obstacles. The user can push or pull the trailer 1 by applying his strength to the pusher handle 14 or can move said trailer by acting on the first actuation means 15. In this configuration, the bed 3 is substantially parallel to the ground S, as shown in FIG. 6, facilitating the resting of objects inside the cart 2. In this configuration, the trailer 1 can be towed by a towing vehicle by coupling the connecting element 13 to the adapted tow hook 100, as shown in FIG. 7. This coupling requires the lifting of the front part of the trailer 1 through the lifting handles 18, since the connecting element 13 is associated below the bed 3; this lifting ensures the separation of the two auxiliary wheels 12 from the ground, allowing to tow the trailer 1 so that it rests on the ground by means of the two movement wheels 7 alone. In view of the geometry of the inner surface 19 and the weight force of the trailer 1, the contact pin 101 of the hook 100 tends to arrange itself in the midpoint 20, as shown in FIG. 8. The forward movement of the towing means, i.e., in a direction that matches the advancement direction A, allows the sliding of the contact pin 101 on the inner surface 19, while the trailer 1, by inertia, remains motionless. The advancement of the contact pin 101 toward the advancement direction A and its subsequent contact with the first button 16a allow the actuation of the traction means, which move in the same direction the trailer 1, reducing the muscular effort of the user. If the towing vehicle stops or reduces its speed, the trailer 1 tends to maintain its own speed due to inertia, moving forward with respect to the contact pin 101. Accordingly, the contact pin 101 slides on the inner surface 19 in a direction that does not match the advancement direction A, making contact with the second button 16b, which in turn actuates the traction means for the rotation of the movement wheels 7 in the opposite direction with respect to the preceding one, in practice braking the trailer 1. As a consequence of the retraction of the trailer 1 with respect to the tow hook 100 (and of the towing vehicle), the contact pin 101 returns to the midpoint 20, the neutral point where it does not activate the traction means in any direction of travel. Once use of the trailer 1 has ended, said trailer is compacted, passing from the configuration for use to the inactive configuration. After closing the seat 21, the side 5b of the central portion 5 is moved toward a side wall 6, moving it angularly with respect to the hinge axis that passes through the cylindrical hinge 9 that is proximate to the side 5a, as shown in FIG. 2, and then the two side walls 6 are moved mutually closer, utilizing the cylindrical hinges 9 arranged between said side walls and the other two walls 10 and 11, as shown in FIG. 3. The trailer 1 thus compacted can be stored in small spaces, such as for example under the stairs, occupying a limited area with respect to the space that it occupies in the configuration for use.

In practice it has been found that the compact trailer according to the present invention achieves the intended aim and objects, since it allows easy use of said trailer, separately from the towing vehicle, even in tight spaces. By way of the arrangement of the movement wheels within the corresponding cavities provided in the side walls, the movement wheels in fact do not increase the space occupation dimensions of the trailer and do not collide against any obstacles that are not clearly visible to the user who moves the trailer. Moreover, the reduced space occupation dimensions allow easy use of the trailer even in tight spaces, such as for example supermarket aisles.

Another advantage of the trailer according to the invention resides in that it has considerably reduced space occupation dimensions when not in use, allowing to store it in small spaces.

A further advantage of the trailer according to the invention resides in that it facilitates its movement, reducing the physical effort of the user thanks to the presence of towing means of the automatic type.

The compact trailer thus conceived is susceptible of numerous modifications and variations, all of which are within the scope of the accompanying claims.

In practice, the materials used, so long as they are compatible with the specific use, as well as the contingent shapes and dimensions, may be any according to requirements and to the state of the art.

The disclosures in Italian Utility Model Application no. MO2013U000014, from which this application claims priority, are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:
1. A compact trailer (1) comprising a cart (2) and a connecting element (13) attached to the cart (2),
wherein
the connecting element (13) is adapted for connecting the connecting element (13) with a bicycle or a motorcycle for towing the cart and the cart (2) has a loading bed (3) and an edge provided with at least two mutually opposite side walls (6), wherein each side wall (6) has a movement wheel (7) rotatably mounted thereon such that the axis of rotation of each movement wheel (7) is transverse to the side wall (6) on which the movement wheel (7) is rotatably mounted and each movement wheel (7) extends below the side wall (6) on which the movement wheel (7) is mounted for supporting said cart (2) and moving the cart (2) in a direction of advancement (A) when each wheel (7) is resting on the ground (S), each side wall (6) has a recessed cavity (8) which partially accommodates the movement wheel (7) rotatably mounted on the side wall (6), said recessed cavity (8) having a depth in the axial direction of the axis of rotation of the movement wheel (7) rotatably mounted on the side wall (6) that is at least equal to the axial space occupation dimension (D) of the movement wheel (7) rotatably mounted within the recessed cavity (8), so that in plan view said movement wheels (7) do not protrude beyond the outer periphery of said cart (2), said cart (2) comprises a front wall (10) and a rear wall (11), wherein the front wall (10) and rear wall (11) are each interposed between said two side walls (6), each have main opposite sides that are pivoted to contiguous sides of said side walls (6), said bed (3) comprises at least a lateral portion (4) and a central portion (5), wherein the lateral portion (4) is integral with at least one of said two side walls (6) and the central portion (5) is pivotably attached to said lateral portion (4), and said cart (2) being movable between (A) a configuration for use, in which said central portion (5) is arranged on a plane that is substantially parallel to the ground (S) and transverse to said two side walls (6) and said front wall (10) and said rear wall (11) are arranged along planes that are substantially transverse to said two side walls (6) and (B) an inactive configuration in which said central portion (5), said front wall (10) and said rear wall (11) are each pivoted, at least partially, toward at least one of said two side walls (6) and said two side walls (6) are mutually closer to each other than in said configuration for use.

2. The trailer (1) according to claim 1, wherein said cart (2) has a space occupation dimension (D) in plan view, transversely to said advancement direction (A), that is comprised substantially between 0.4 and 0.6 meters.

3. The trailer (1) according to claim 1, further comprising two auxiliary wheels (12) associated with said bed (3), said two auxiliary wheels (12) and said two movement wheels (7) having an identical distance between a respective point of contact with the ground (S) and said bed (3).

4. The trailer (1) according to claim 3, further comprising at least one pusher handle (14) associated with said rear wall (11) for pushing said trailer (1) when the cart (2) is not engaged with a bicycle or motorcycle and resting on said two movement wheels (7) and said two auxiliary wheels (12).

5. The trailer (1) according to claim 1, wherein said connecting element (13) is associated with said bed (3) in a downward facing region.

6. The trailer (1) according to claim 1, further comprising an electric motor associated with each said movement wheel (7), said electric motor being associated with, and actuatable by, a first actuator (15) arranged proximate to said pusher handle (14) and a second actuator (16) associated with said connecting element (13), which can be actuated by a tow hook (100) of a moving bicycle or motorcycle engaged with said connecting element (13).

7. The trailer (1) according to claim 1, further comprising a seating element (21) that is associated with said rear wall (11), wherein the seating element (21) can be folded up when not in use.

8. A compact trailer (1) comprising a cart (2) and a connecting element (13) attached to the cart (2),
   wherein
   the connecting element (13) can be associated with a bicycle or a motorcycle,
   the cart (2) has a loading bed (3) and an edge provided with at least two mutually opposite side walls (6), wherein each side wall (6) has a movement wheel (7) rotatably mounted thereon such that the axis of rotation of each movement wheel (7) is transverse to the side wall (6) on which the movement wheel (7) is rotatably mounted and each movement wheel (7) extends below the side wall (6) on which the movement wheel (7) is mounted for supporting said cart (2) and moving the cart (2) in a direction of advancement (A) when each wheel (7) is resting on the ground (S),
   two auxiliary wheels (12) are associated with said bed (3), said two auxiliary wheels (12) and said two movement wheels (7) having an identical distance between a respective point of contact with the ground (S) and said bed (3) and
   an electric motor is associated with each said movement wheel (7), said electric motor being associated with, and actuatable by, at least one first actuator (15) arranged proximate to said pusher handle (14) and a second actuator (16) associated with said connecting element (13), which can be actuated by a tow hook (100) of a moving bicycle or motorcycle engaged with said connecting element (13).

* * * * *